Patented Apr. 8, 1941

2,237,441

UNITED STATES PATENT OFFICE 2,237,441

VISCOSITY-LOWERING PRODUCT AND THE PROCESS OF MAKING THE SAME

Stroud Jordan, Brooklyn, N. Y.

No Drawing. Application April 29, 1937,
Serial No. 139,735

7 Claims. (Cl. 260—403)

This invention relates to a product for wetting pulverulent solid materials, or to a viscosity-lowering product and the process of making the same.

More particularly the invention relates to a product for modifying the viscosity or surface tension of the continuous phase of a liquid to facilitate the complete wetting or suspension of small granular particles in the liquid.

The product of the present invention has the remarkable ability of modifying the physical properties of a liquid such as fat or oil to change the viscosity and surface tension, the nature of the modifying action not being fully understood. The product is colloidally soluble in most fats and oils and appears to have a strong electrical ionization or charge such that a comparatively small amount of product will instantly act to reduce to its minimum viscosity a mixture of fat and insoluble granular particles.

To store this concentrated energy the product has a complex molecular structure which is produced by the condensation of complex molecular material such as animal fats, greases and waxes. The condensation is carried on by means of heat regulation and a condensing and/or catalyzing agent which to a limited degree enters into the molecular structure of the product. Preferably the condensation is carried to the point where there is a degradation or deposition of free carbon and the crude product containing the most energy or active properties is dark colored or black. The condensation agent is preferably an anhydrous product such as phosphorus pentoxide so that during the condensing action any water formed is absorbed by the condensing agent and the product is dehydrated.

The desired product may be made directly from lanolin, a purified wool fat by a combined condensation and esterification reaction. Phosphorus pentoxide is preferably used as a condensing agent and the lanolin preferably is dissolved in a solvent such as benzol for the commencement of the reaction. The esterification may be carried on at any temperature from 40° F. up to 150° F. The esterification of lanolin with phosphorus pentoxide proceeds simultaneously with the condensation but is completed before the condensation. The condensation reaction requires much more time for completion than the esterification. At low temperatures around 40° F. the condensation requires several weeks time for completion. At room temperatures around 70° F. the condensation will be completed in from two to four days of reaction. At temperatures around 140° to 150° F. the condensation may be completed in several hours. The condensation reaction is exothermic and if the reaction is started at temperatures around 140°–150° F. the temperature will often rise to approximately 300° F. before it is completed. At the high temperatures the condensation continues to the point of degradation of the mixture and carbon is precipitated or set free. This imparts a black color to the product but it is found that the product that has been condensed to the point of carbon precipitation is more effective as a viscosity modifier than one which has not had the condensation continued so far. At low temperatures the condensation product is light brown in color and there is only a minimum amount of carbon produced by the reaction.

Natural lanolin contains cholesterin and complex fatty acids. The cholesterin constituent of lanolin contains a hydroxyl radical and reacts readily with the phosphoric pentoxide to form phosphoric acid esters. The complex fatty acids in the lanolin react with the phosphorus pentoxide to carry on a condensation reaction wherein water is set free. The condensation reaction builds up a very complex molecular structure which becomes of high molecular weight as the condensation continues up to the point of precipitation of carbon. This highly condensed product is very thick and viscous and has a black color with a waxy appearance.

In place of using natural lanolin for the condensation reaction the natural lanolin may be saponified to produce complex fatty acids and then the fatty acids are condensed by the reaction of phosphorus pentoxide. The lanolin is preferably saponified with alcoholic potash to form soap, the soap being treated with a mineral acid such as hydrochloric acid to neutralize the soap and washed with water to set free the complex acid constituents. The acid product thus formed by the saponification is then ready to be condensed with phosphorus pentoxide. If natural lanolin is treated directly with a substantial amount of phosphorus pentoxide, that is more than 5% by weight it has been found that the anhydrous agent acts first to split the lanolin forming the acid constituents and then the condensation action is carried on directly wherein water is set free and the molecular structure built up. In this way lanolin can be used directly to form acids as intermediate products and then the condensation of the acids continued. When lanolin is saponified by the use of alcoholic potash and the fatty acids set free by the neutralization with hydrochloric acid the hydroxyl radical of the cholesterin constituent of lanolin remains and this hydroxyl radical reacts with the phosphorus pentoxide by the subsequent treatment to form the phosphoric acid esters. When the lanolin is split with phosphorus pentoxide the cholesterin hydroxyl radical reacts with the phosphorus pentoxide to form the phosphoric acid esters at the same time that the fatty acid constituents of the lanolin are being produced.

The use of 1 to 5% by weight of phosphorous pentoxide is satisfactory for the esterification or formation of the phosphoric acid esters of lanolin. When a combined condensation and esterification reaction is carried out with natural lanolin it is often advantageous to use from 10 to 100% of phosphorus pentoxide in promoting the reaction. When such a large percentage of phosphorus pentoxide is used in the condensation it is preferably best to add the phosphorus pentoxide in successive stages to gradually build up the total amount of phosphorus pentoxide in effecting the best condensation. If active agitation and frequent addition of phosphorus pentoxide is carried out the condensation and esterification reaction may be completed in a comparatively short time.

The condensation and phosphorizing of the product may be facilitated by heat and agitation and by this means a minimum amount of phosphorus pentoxide may be used in carrying on the condensation. When using 5% or less of phosphorus pentoxide to the weight of the lanolin being condensed it has been found that the condensation preferably should extend over a period of three to four hours with agitation and heat in order to become complete. It will be seen therefore that the condensation depends upon the amount of phosphorus pentoxide used, the time for the condensation reaction, the temperature of the reaction products and the thoroughness of the agitation of the reaction mixture.

After the condensation has been completed the product is preferably purified by one or more treatments or extractions with acetone. The acetone treatment may be either hot or cold. After the acetone-soluble material has been extracted the residue is dissolved in a suitable solvent such as benzol and settled with or without the use of material such as carbon or calcium carbonate and the resulting material is ready for treating oil and solid material mixtures to modify their viscosity. Preferably the purified material is dissolved in the fat or oil which is a continuous phase of the mixture being treated in order that the viscosity lowering effect may be immediately transmitted to all parts of the mixture. In place of acetone it has been found with some forms of material that the extraction may be made with ethyl alcohol ($C_2H_5OH$), ethyl ether and water or these compounds may be used in conjunction with acetone for extracting soluble material. It is the acetone-insoluble extract that usually has the greatest effect in modifying the viscosity characteristics of an oil-insoluble granular material mixture.

The following is a typical example of the condensation of lanolin:

*Example.*—100 grams of anhydrous lanolin were dissolved in 100 cc of zenzol and treated with 10 grams of $P_2O_5$ and heated two hours on a steam bath and left standing over night. This material was then filtered with the aid of carbon and calcium carbonate and the material in the filtrate when separated from the solvent was very effective in modifying the viscosity of a chocolate coating consisting of chocolate, added cocoa butter and sugar. The material which has been filtered may be extracted several times with cold acetone and the acetone-insoluble material is then suitable for treating a chocolate mixture to modify its viscosity.

The condensation products made in accordance with the present invention are all oil and fat soluble colloids which are insoluble in water. The products all tend to emulsify with water and are mostly insoluble in acetone, although some products soluble in acetone have been effective in modifying the viscosity of oil-granular material mixtures. It has been found that the crude condensation products are acid in character, very viscous, of a black waxy appearance, odorless and tasteless. The property of reducing the viscosity of oil-pulverulent granular mixtures is the most striking property of these products. The products tend to modify the surface tension of oil and fat solutions. Most of the condensation products are soluble in alcohol, ethyl ether and petroleum ether.

A condensation product semi-liquid or waxy in character as made from lanolin, for example, is an ideal viscosity controller for chocolate coatings because it will remain in solution in the chocolate at normal temperatures and thus be effective for maintaining the minimum viscosity of a mixture of chocolate and sugar at normal temperatures.

A colloid condensation product made in accordance with the present invention has considerable application in industry. It may be used for wetting fine particles of an oily medium in a mixture of oil and solid materials. It may be used in making chocolate coatings or mixtures of cocoa butter, chocolate and sugar. It may be used in making mixtures of sugar in butter, milk and cream. When using the colloid in these mixtures of oils or fats with solid particles the maximum amount of solid part or solid particles may be combined with a minimum amount of oily or fatty material. It may be used to retard graying in chocolate for wetting the surface of hides and leather and for oiling the surface of threads and yarn in knitting, weaving and spinning.

Due to the property of the condensation product to reduce mixtures of oils or fats with solid pulverulent material to its minimum viscosity the product is efficient for plasticizing mixtures for molding. With many mixtures such as chocolate coatings the condensation product has the property of causing the mixture to contract when cooling and solidifying. This is very important in that it facilitates the removal of the mixtures from molds and reduces to a minimum the loss when molding.

This invention is a continuation in part of my application, Serial No. 741,936, filed August 29, 1934, for Viscosity lowering product and process of making same, now Patent No. 2,185,592.

Having thus described the invention, what is claimed as new is:

1. A fat soluble colloid comprising the condensation product of lanolin with phosphorus pentoxide wherein the major portion of the lanolin is condensed to the point of degradation or carbon formation and a phosphoric acid ester formed by esterification of a free hydroxyl radical of the lanolin.

2. A process of making a water insoluble colloid comprising treating lanolin with phosphorus pentoxide at a temperature above 140° F. to effect condensation of the lanolin and separating acetone soluble material from the condensation product.

3. A process of making a water insoluble colloid comprising condensing lanolin with phosphorus pentoxide and simultaneously esterifying a hydroxyl radical of the lanolin with phosphorus pentoxide to produce a phosphoric acid ester.

4. A process of making a water insoluble colloid comprising treating lanolin in a benzol solution with phosphorus pentoxide under a temperature above 140° F. to effect condensation of the lanolin and separating acetone soluble material therefrom.

5. A fat soluble colloid comprising the condensation and esterification product of the treatment of lanolin with phosphorus pentoxide, said colloid being a thick, black, waxy product insoluble in water.

6. A fat soluble colloid comprising a condensation product of the treatment of lanolin with phosphorus pentoxide in combination with a phosphoric acid ester of lanolin constituents, said colloid being water-insoluble, odorless, tasteless and having a black, waxy appearance.

7. A fat soluble colloid comprising the condensation product of the treatment of lanolin with phosphorus pentoxide in combination with a phosphoric acid ester of the cholesterin constituents of lanolin, said colloid being water-insoluble, tasteless, odorless and having a thick, black, waxy appearance.

STROUD JORDAN.